Oct. 18, 1927. 1,645,697
O. T. GREGORY
AWNING
Filed Aug. 4, 1926
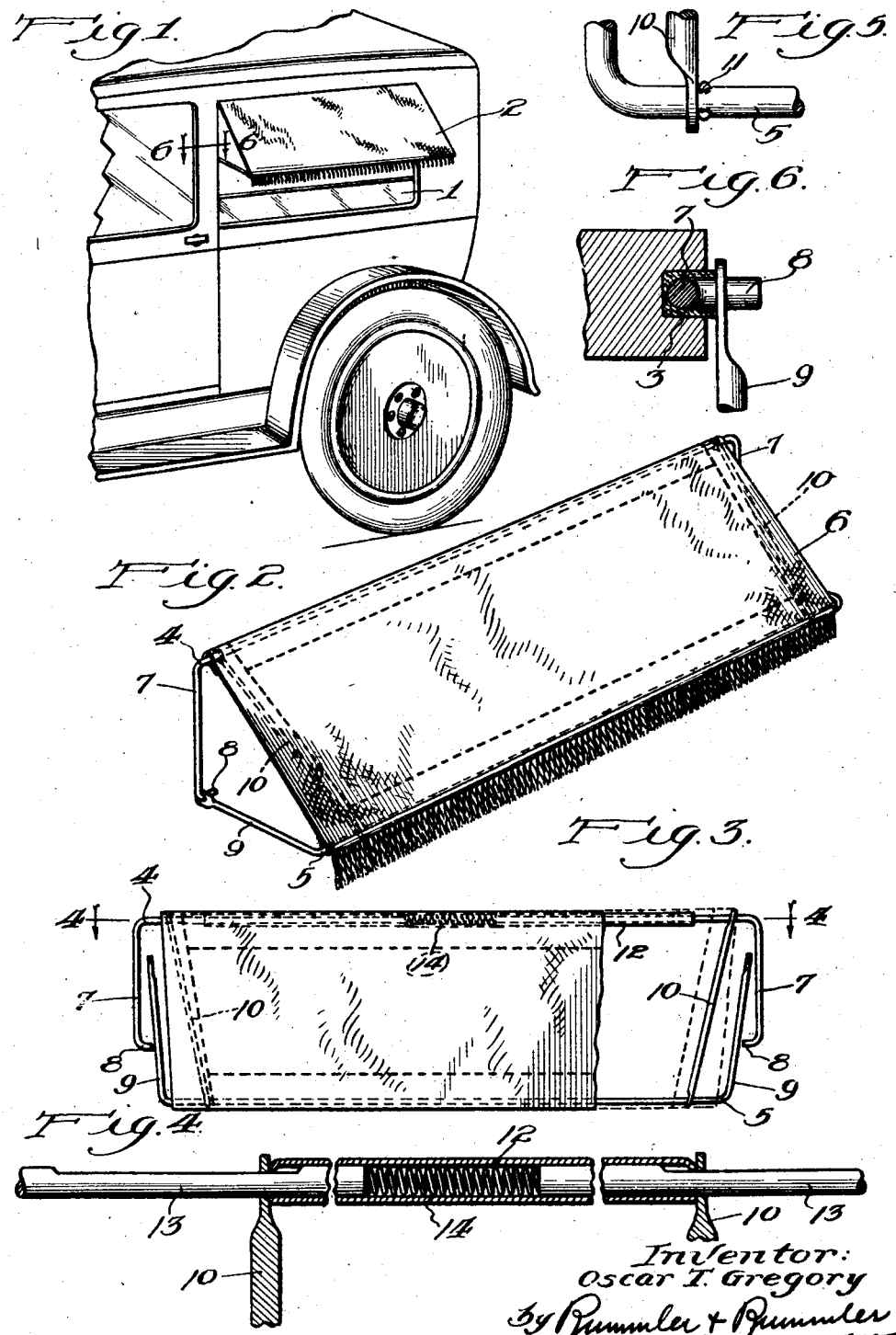
Inventor:
Oscar T. Gregory
by Rummler & Rummler
Attys Patented Oct. 18, 1927.

1,645,697

UNITED STATES PATENT OFFICE.

OSCAR T. GREGORY, OF CHICAGO, ILLINOIS, ASSIGNOR TO GREGORY AUTO AWNING CORPORATION, OF OIL CITY, PENNSYLVANIA, A CORPORATION OF DELAWARE.

AWNING.

Application filed August 4, 1926. Serial No. 127,030.

This invention relates to improvements in awnings, especially for the side windows of automobiles; and the main objects are to provide a simple, substantial, neat appearing awning which can be mounted in the window groove without extra fastening means, which can be folded flat for storing in the car, which is rigid when in position, and which can be put up or taken down without difficulty.

An illustrative embodiment of this invention is shown in the accompanying drawings, in which:—

Figure 1 illustrates the awning in use on a car.

Fig. 2 is a perspective view of the awning.

Fig. 3 is a view of the awning when folded, with a portion of the awning cloth broken away.

Fig. 4 is a sectional detail of the transverse portion of the upper bow.

Fig. 5 is a detail of the corner construction of the lower bow.

Fig. 6 a fragmental detail taken substantially on the line 6—6 of Fig. 1, and illustrating the manner of seating the awning in the window groove.

In the form shown, the awning is proportioned so that it may be mounted in the side window openings of closed cars to protect the eyes of the occupants from the glare of the sun. The window glass 1 usually is arranged to be raised and lowered and the awning 2, as herein shown, is arranged to be mounted in the groove 3 of the window opening.

The awning frame comprises a pair of bow frames 4 and 5, hemmed in the upper and lower edges of the awning cloth 6, and having inter-engaging transverse arms at each end. The horizontal portion of the upper bow 4 is made resiliently extensible so that the side portions 7 may be engaged in the window groove 3. The lower ends 8 of the side portion 7 are bent to form studs which project inwardly, and the ends of the side portions 9 of the lower bow 5 are provided with eyes for engaging the inwardly projecting studs 8.

Preferably the transverse portions of the bows 4 and 5 are held in spaced relation by the stay rods 10. The stay rods 10 are provided with eyes at the ends which slip over the transverse portions of the rods of the two bows, and are stitched into a fold in the awning cloth. At the lower end, the rods 10 are prevented from slipping outwardly by the corner bend in the bow 5, and stopped from moving inwardly by means of lugs 11 formed in the rod 5.

The horizontal portion of the bow 4 comprises a tube 12 in which the ends of the rod portions 13 are slidably held. The rods 13 are flattened at one side as shown in Fig. 4 and the ends of the tube are bent inwardly to engage with the flattened portions of the rods to prevent the rods from relative turning and also from being withdrawn from the tube 12. A compression spring 14 is inserted in a tube 12 between the inner ends of the rods 13, and urges the rods apart.

For mounting the awning in position, the side portions 7 of the upper bow 4 are pressed inwardly and inserted in the window grooves. When released, the end portions engage in and press against the felts of the window grooves 3 and provide a frictionally held support for the awning. The ends of the sides of the lower bow 5 are then sprung inward and engaged with the end 8 of the upper bow. This holds the lower edge of the awning rigidly extended outwardly.

For fitting the window, the lower bow 5 is preferably made of sufficient length that the ends of the side portions or arms 9 are sprung inwardly when the frame is mounted in the window opening, and this holds the ends from disengaging and prevents rattling.

In taking the awning down, the arms of the lower bow are disengaged from the ends of the side portions of the upper bow, which may then be compressed and taken out of the window grooves.

When released, the upper bow is expanded by the spring 12 to the limits provided by the engagement of the indented ends of the tube with the shoulders at the inner ends of the flats in the rods 13, and the arms 7 and 9 fold up into the plane of the awning cloth 6, so that the awning may be stored flat under a seat or in some other part of the car and will occupy a minimum of space.

In the folded position the rods 10 serve to hold the awning cloth extended. This prevents wrinkling or damaging the cloth. The rods 10, being in angular relation, also brace the lower bow against lateral movement when the awning is in position on the car. This construction effectually prevents rattling and is very rigid in position.

Although but one specific embodiment of this invention has been herein shown and described, it will be understood that numerous details of the construction shown may be altered or omitted without departing from the spirit of this invention as defined by the following claims.

I claim:

1. In an automobile window awning, an awning cover, a bow frame attached to the upper edge of said cover, said frame being resilient and having downwardly projecting side portions for engaging in the window glass grooves, and a second bow frame attached to the lower edge of said cover, stays connecting the edge portions of the bow frames to hold the cover permanently extended, said frames rotatable in position, and said second frame having side arms engageable and disengageable with said side portions.

2. In an automobile window awning, a pair of cooperating resilient bow frames for the upper and lower edges respectively of the awning, stays for permanently holding the frames in spaced relation; the upper of said frames having downwardly extending side portions which are provided with inwardly projecting ends; and the lower of said frames having side arms with eyes formed in the ends for engaging on said inwardly bent ends.

3. In an automobile awning, a pair of resilient bow frames each having transverse portions and side portions bent angularly to said transverse portions, an awning cloth attached at the opposite edges to the transverse portions of the respective bow frames, stays stitched into the sides of the awning to hold the frames in fixed spaced relation; the side portions of one frame adapted to be engaged in the opposite window glass grooves, and the side portions of the other frame removably engaged with and adapted to press outwardly on the side portions of the one frame.

4. In an automobile awning, a substantially rectangular frame stitched into the awning cloth to hold the same extended, said frame having arms projecting at right angles from the upper corners, and arms projecting angularly from the lower corners, said arms being rotatable so as to fold into the plane of the awning cloth, and relatively engageable to support the cloth in an inclined position.

5. In an automobile window awning, a pair of bow frames having angularly extending side portions whereby the awning may be mounted in position, stay rods connecting the transverse portions of said bows, an awning cloth stitched to said stay rods and the transverse portions of the bows, said bows being rotatable in the awning cloth and in the connections with the stay rods for folding the side portions into the plane of the awning cloth, and the side portions of said bows being interconnectable to support the cloth in an inclined position and also resilient so as to spring outwardly to engage in the window.

6. In an awning frame, an upper edge member having yieldable side portions adapted to be engaged in the window grooves and to rotate into the plane of the awning, and a lower frame member having resilient side arms which are foldable into the plane of the awning and are engageable with said side portions of the upper edge member to support the awning in an inclined position, and stays connecting the transverse portions of said frame members to hold the awning permanently extended.

Signed at Chicago this 2nd day of August, 1926.

OSCAR T. GREGORY.